United States Patent [19]

Seli

[11] Patent Number: 4,696,788

[45] Date of Patent: Sep. 29, 1987

[54] PROCESS AND DEVICE FOR DETECTING DEFECTIVE CLADDING SHEATHS IN A NUCLEAR FUEL ASSEMBLY

[75] Inventor: Michel Seli, Caluire, France

[73] Assignee: Framatome et Cogema "Fragema", Courbevoie, France

[21] Appl. No.: 763,732

[22] Filed: Aug. 8, 1985

[30] Foreign Application Priority Data

Aug. 8, 1984 [FR] France ................. 84 12561

[51] Int. Cl.$^4$ ................................ G21C 17/00
[52] U.S. Cl. ................................ 376/253; 376/251
[58] Field of Search ................. 376/253, 251

[56] References Cited

U.S. PATENT DOCUMENTS

| | | | |
|---|---|---|---|
| 3,073,767 | 1/1963 | Whitman et al. | 376/253 |
| 4,034,599 | 7/1977 | Osborne | 376/253 |
| 4,072,559 | 2/1978 | Neidl et al. | 376/253 |
| 4,147,587 | 4/1979 | Utamura et al. | 376/253 |
| 4,318,777 | 3/1982 | Sujumura et al. | 376/253 |
| 4,382,906 | 5/1983 | Ambros et al. | 376/253 |
| 4,416,847 | 11/1983 | Saito et al. | 376/253 |
| 4,537,740 | 8/1985 | Colburn | 376/253 |

*Primary Examiner*—Salvatore Cangialosi
*Attorney, Agent, or Firm*—Pollock, Vande Sande & Priddy

[57] ABSTRACT

A sipping test for detecting defective sheaths in a nuclear fuel assembly is carried out by increasing the pressure of the gases within the sheaths by increasing the temperature. The fission products are released in case of sheath failure. A mixture of water and inert gas is introduced into a hood containing the fuel assembly. Gas and water are separated at the upper portion of the hood and are circulated in distinct loops for continuous detection of the water-soluble fission products and the gas-driven fission products.

10 Claims, 6 Drawing Figures

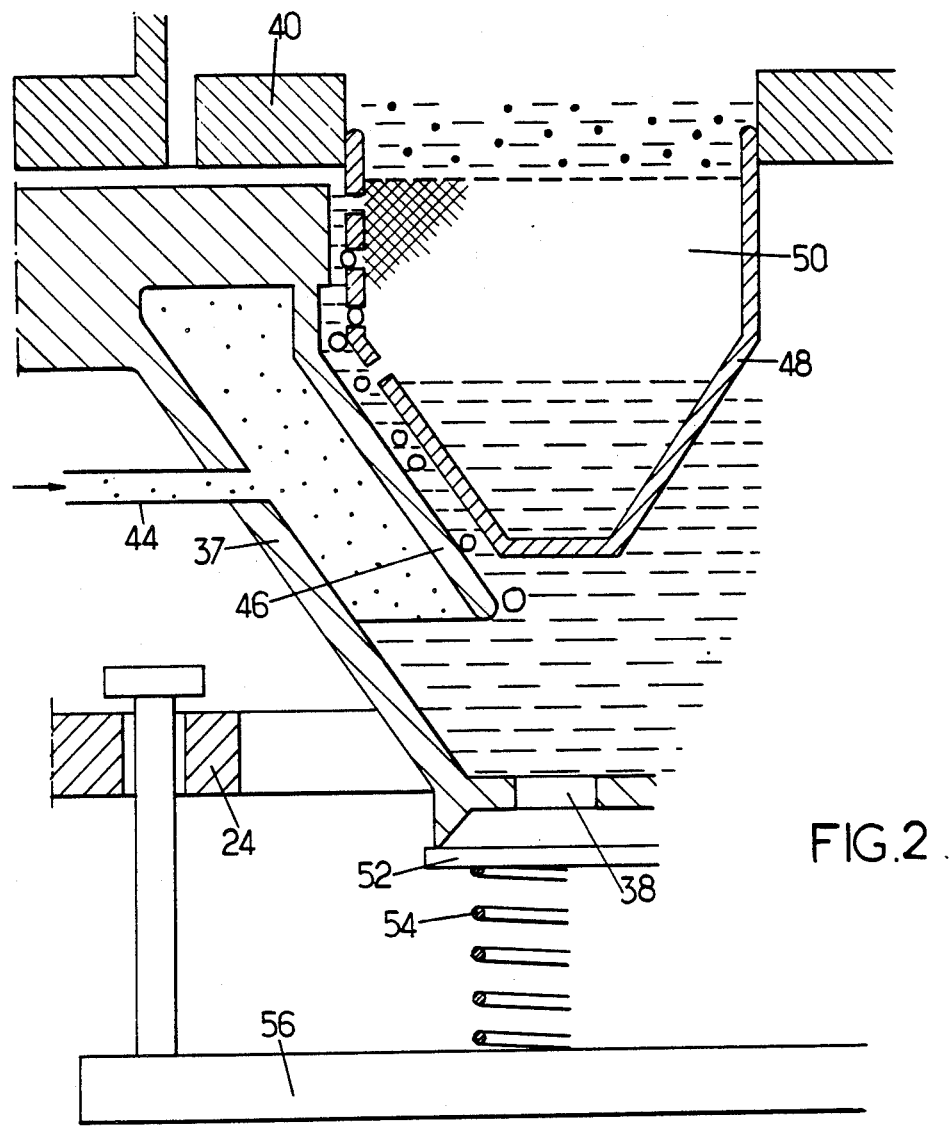
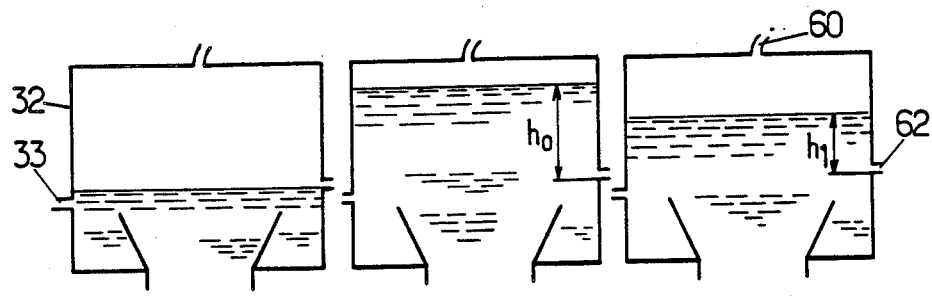

PROCESS AND DEVICE FOR DETECTING DEFECTIVE CLADDING SHEATHS IN A NUCLEAR FUEL ASSEMBLY

FIELD OF THE INVENTION

The invention relates to a process and device for subjecting nuclear fuel assemblies to a shipping test and detecting defective classing sheaths in the fuel assembly. It is particularly suitable for use with fuel assemblies used in water cooled and moderated reactors which comprise a bundle of fuel elements held assembled together by a structural "skeleton".

BACKGROUND OF THE INVENTION

Fuel assemblies must be checked systematically in several situations. Assemblies already irradiated but not exhausted must be checked before reloading them into the core during a refueling operation. Fully spent assemblies which have been left for some time in a deactivation pool must be checked before they are sent to a reprocessing plant. Additional precautions must be taken during reprocessing and during dismantling of assemblies having leaky fuel elements.

The most frequently used method for testing the tightness of the sheaths is sipping, consisting in increasing the pressure of the gases in the sheaths by increasing the temperature (by supplying heat or by the residual thermal power of the fuel) so that fission products are released in case of a defect, and measuring the activity or increase of activity of a fluid sweeping the sheaths of the inspected assembly.

Different fission products escape through possible cracks. They may comprise gases, such as xenon 133, and water soluble products such as iodine 131. When the assembly being tested has deactivated, the gaseous fission products are not very abundant or have parameters which are difficult to measure in line. The analysis of a gas flow which has swept the assembly then provides unmeaningful results. On the other hand, such assemblies will contain water soluble fission products (iodine 131 after a short cooling period and isotopes 134 and 137 of caesium for longer cooling periods), and monitoring a water flow which has swept the assembly will allow defect detection. Conversely, such a water flow will not allow direct detection of fission products revealing a defective sheath in an assembly removed from a reactor at an early stage and immediately subjected to the test. Monitoring a gas flow allows meaningful results to be obtained.

In a prior art process (French Pat. No. 2,389,202) for testing the tightness of the cladding sheaths of a nuclear fuel assembly, the assembly is placed in a hood immersed in a protective pool, the assembly is heated to a predetermined temperature, a fluid is flowed through the chamber for entraining the gaseous fission products possibly released through defects, and the activity of the fluid leaving the hood is measured. According to that patent, the hood comprises heating to the required temperature plates for rapidly heating those of the assemblies which have only a low residual thermal power. The device further comprises means for carrying out the test either by aspiration of water having swept the assembly or by extraction of bubbling gas.

SUMMARY OF THE INVENTION

It is an object of the invention to provide a process and a device for measuring, simultaneously or successively, the contents of water soluble fission product and gaseous fission product, practically in real time. It is a more specific object to provide measurements providing an estimation of the geometry of the defect.

To this end, there is provided a process as defined above, wherein water and an inert gas are introduced at the same time for forming the fluid and are separated on leaving the chamber, and the water and inert gas are caused to flow in separate respective loops so as to detect, simultaneously, the fission products soluble in water and the fission products carried by the gas. A constant water volume is preferably maintained in the water "loop". Water and gas are typically mixed by introducing them separately at the base of the hood and causing them to pass together through a homogenization filter, before the mixture sweeps the assembly.

There is also provided a detection device comprising a double wall cell for immersion in vertical position in a pool and for receiving a fuel assembly hood, the cell comprising means for adjusting the level of the water inside the double wall, and means for flowing water and gas which sweep the assembly and flow in a circuit comprising activity measurement means, wherein that circuit comprises a water loop and a gas loop which have a common part and said hood comprises a homogenization filter placed on the bottom of the hood and means for injecting said water and gas into the hood under the filter.

With this arrangement, reproducible test conditions may be maintained, more particularly as regards the physical parameters (temperature, pressure, response time). From the measured values and the evolution thereof, the kinetics of the relaxation mechanism can be estimated and the nature and size of the defect may be guessed.

BRIEF DESCRIPTION OF THE DRAWINGS

The invention will be better understood from the following description of a particular embodiment, given by way of example, with reference to the accompanying drawings, in which.

SHORT DESCRIPTION OF THE DRAWINGS

Figure 1:
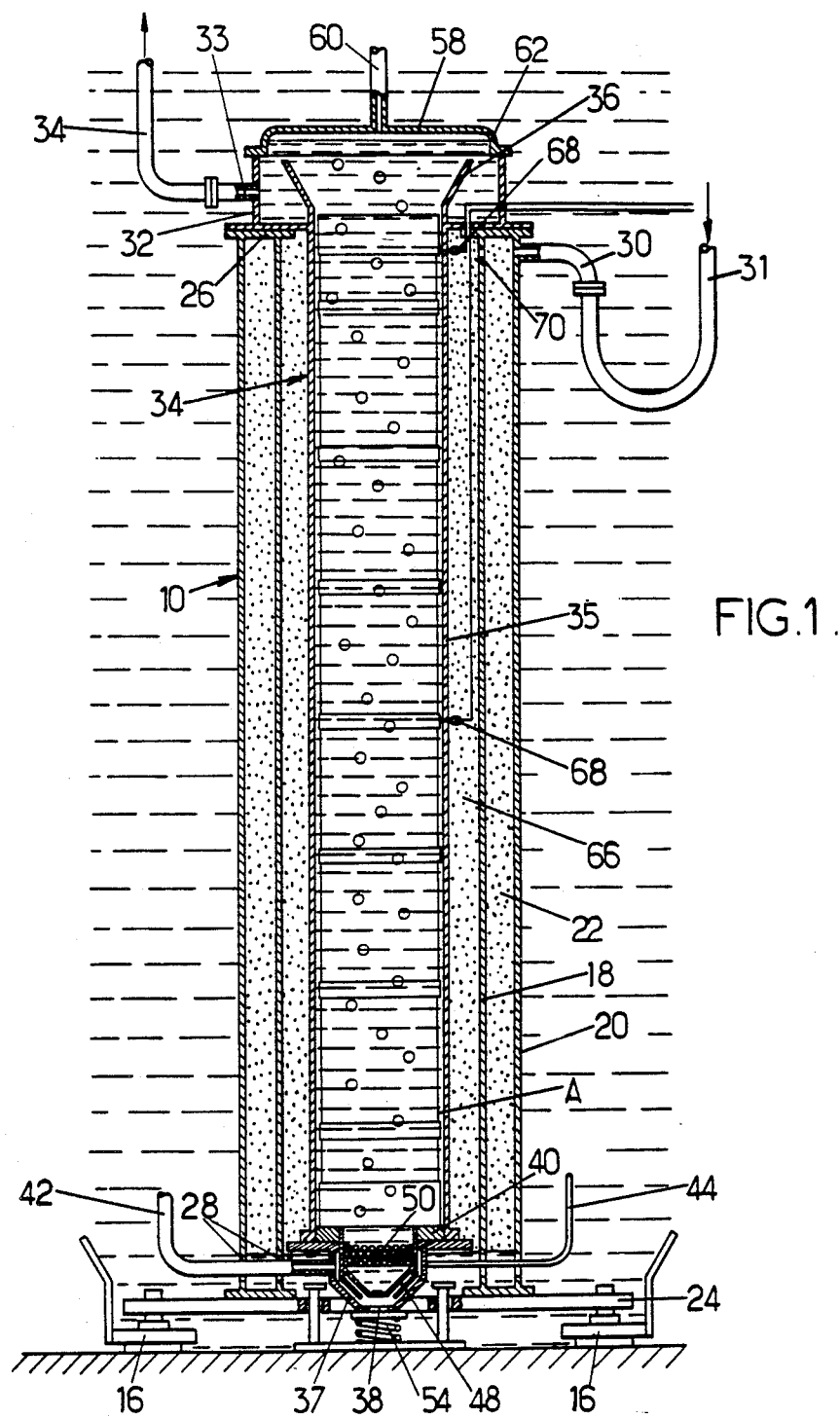
Figure 3:
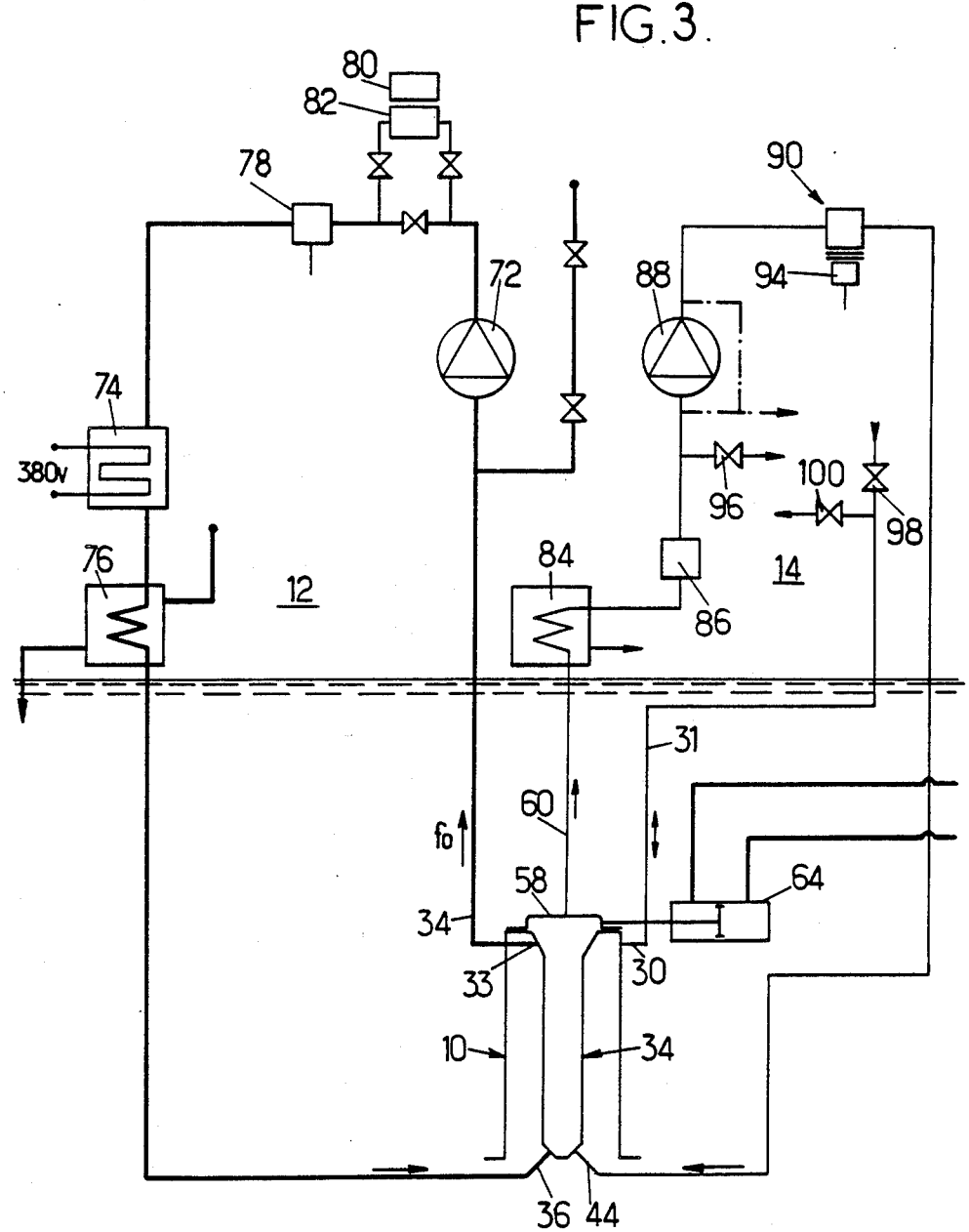

FIG. 1 is a general diagram showing a double wall cell belonging to a device according to the invention, in section along a vertical plane passing through its axis;

FIG. 2 is an enlarged detail view showing the lower part of the cell of FIG. 1;

FIG. 3 is a diagram of the flow of the fluids in the device; and

FIGS. 4a, 4b and 4c show the water level in the cell at several operating phases.

DETAILED DESCRIPTION

Referring to FIGS. 1 and 2, the device comprises a sipping cell 10 having a general construction similar to that described in French Pat. No 2,389,202, associated with a flow and measurement circuit comprising a water loop 12 and a gas loop 14.

Cell 10 is arranged for being supported by the bottom wall of a biological protection pool having for this purpose adjustable feet 16. It has an external structure comprising two vertical coaxial cylindrical walls 18 and 20, defining therebetween an annular space 22, connected together by a bottom plate fast with a base 24 formed with supporting feet. A plate 26 connects the top ends of walls 18 and 20. Opening 28 are formed in the lower part of walls 18 and 20 for ingress of pool water. A tapping 30 at the top end of the angular space 22 is provided for gas supply through a flexible pipe 31.

Plate 26 is arranged for supporting a water box 32 forming the upper part of a hood 34 for receiving a fuel assembly to be tested (whose shape is schematically shown in FIG. 1). The water box has a tapping 33 for connecting to a water outlet pipe 34. The lower wall of the water box is connected to a rigid tubular structure 35 which has an upwardly directed extension 36 which is cone shaped for easier introduction of the fuel assembly and a downwardly directed cylindro-conical end piece 37 formed with an axial aperture 38. A plate for supporting the fuel assembly, having a large sized central hole therethrough for passage of a gas-water mixture is supported by end piece 37.

End piece 37 is provided for passing gas-liquid intended for scavenging, and mixing them intimately before they sweep the fuel assembly contained in the cell.

It comprises a water intake 42 and a gas intake 44 opening into a narrow annular gap defined by the wall of end piece 37 and a wall 46 which is parallel thereto (FIG. 2). The gas and air flows must pass around wall 46 to reach a filter-strainer 48 giving access to the hood, which filter contains an emulsification mass 50 which may for example be made from metal cloth.

Base 24 carries a closure unit for separating the inside of the hood from pool water when the hood is in position. The unit comprises a plug 52 subjected to the action of a closure spring 54. Referring to FIG. 2, spring 54 bears on a plate 56 retained on plate 24 by slidable rods. When the cell and the hood are in operative condition, the weight of the hood compresses spring 54 which holds the plug applied and in addition compensates for differential expansion on the other hand. If the hood and cell are lifted, the spring is no longer compressed by plate 56 supported by the bottom of the pool. The hood then empties when it is raised.

The hood further comprises a removable lid 58 for introduction and removal of the fuel assembly. This lid has a central pipe 60 for gas escape and a vent 62 (FIG. 1). The lid will generally be adapted for opening by linear movement, for example under the action of a ram 64 (FIG. 3).

The tubular structure 35 and wall 18 define an annular space 66 which, like space 22, may be filled at will either with water or with gas (by driving out water with pressurized inert gas introduced through tapping 30). The gas is thus directly admitted into space 22. It passes into space 62 through holes 70 formed in the upper part of wall 18. Replacement of water by gas in spaces 22 and 66 reduces the heat losses of the fuel assembly towards the water of the pool and makes it possible to regulate the temperature reached under the action of the residual thermal power and measured by probes 68.

No seal is required since the internal and external pressures acting on the cell are equivalent. The bearing forces provide sufficient sealing to prevent undesirable mixing of the water of the test circuit and that of the pool.

Finally, electric heating elements may be provided on the body of the hood, if desired, to increase the rate of temperature rise of the fuel assemblies to be tested.

The cell shown in FIGS. 1 and 2 may be associated with a circuit as shown in FIG. 3.

According to FIG. 3, the water loop 12 of the circuit forms a closed system comprising a pump 72 for water circulation in the direction shown by arrow $f_0$. Pump 72, as well as the elements of the circuit other than cell 10, is above the level of the water in the pool and in a biological protection shield, comprising for example lead plates. The loop comprises a heater 74, typically an electric resistor, and a cooler 76 operating, for example, by heat exchange with water from an external circuit discharged into the pool. Means (not shown) control the heater and the cooler for maintaining a predetermined temperature with accuracy. Loop 12 further comprises a sampling apparatus 78, which will not be described since it may be conventional, and an apparatus for continuous activity measurement. This apparatus may comprise a detector 80 which measures the level of radiation emitted by the water in a bypass chamber 82 defined by cut-off valves provided for retaining a sample of known and constant volume. Chamber 82 should be designed so as to reduce the deposits of activated products. It will generally be internally polished and formed from anodized aluminum.

The detection apparatus in the water loop 12 is provided for measuring the activity of the water soluble fission products. These will be essentially iodine 131 for assemblies with a short deactivation time and the isotopes 134 and 137 of caesium for assemblies having undergone a long deactivation storage.

Finally, loop 12 comprises additional means for filling it with demineralized water and for emptying it.

The gas loop 14, between pipe 60 and tapping 44, comprises successively an expansion condenser 84 (or a system with equivalent effect, for example a permeating drier) for eliminating condensable vapors, and an anti-water-rise device 86 with a float controlled shut-off valve. Loop 14 then comprises a suction pump 88 and a gamma radiation detector 90. A bypass of the circuit, short-circuiting the pump (shown in broken lines in FIG. 3) is used when it is desired to take gas samples. It allows the following operations to be carried out successfully:

the air contained in a sample flask is drawn,
the flask, in which vacuum has been created, is filled with gas flowing through the loop.

The operations for emptying and filling the flask may be readily automated, which allows a good reproducibility of the physical parameters (pressure, volume and temperature) to be maintained from one sample to the other without any risk of error due to an operator. In addition, because of the safety related to the automation of the system, the samples may be taken without a glove box.

The gamma radiation detector 90 may be of a conventional type. It is provided for the independent measurements of the xenon 133 and krypton 85 content. A detector may more particularly be used having a sodium iodide (NaI) scintillator crystal 94 associated with a multichannel analyser. The loop may be completed with a gas withdrawal take-off 96 for limiting the gas losses through the vent during the rise in temperature.

Finally, the circuit comprises a circuit for adjusting thermal insulation through spaces 22 and 66. This regulation is provided by admission or escape of inert gas (nitrogen, for example) through respective valves 98 and 100 actuated on request.

The process of the invention may be put into practice in different sequences. The one which will now be described seems preferable in most cases.

After a fuel assembly is placed in cell 10, the loops are filled and the fluids set in circulation. The water loop 12 and the cell are filled, for example by circulating using the pump 72. Gas is then introduced through pipe 60 until it escapes through vent 62 (FIG. 4a). The escape of gas bubbles through vent 62 corresponds to a well defined pressure inside loop 14. Once pressurization is established, an amount of gas selected by the operator is withdrawn through valve 96 so as to cause the free water level to rise to a predetermined height H above the vent 62 (FIG. 4b). A height $h_0$ to about 40 mm will be generally satisfactory. It avoids, at normally encountered operating temperatures, gas escape through vent 62. Consequently, the water and gas masses contained in the respective loops will remain substantially constant (disregarding the gas coming from gas release by water in cell 10).

Water and gas are then caused to flow through loops 12 and 14 and, at the same time, the heater 74 is controlled so that the temperature measured by sensors 68 reaches a predetermined level. Once the working temperature is reached, the free water surface is stabilized at a level higher than the previous level, corresponding for example to $h_1 = 15$ mm (FIG. 4c). In case of excessive gas expansion in loop 14, the inner and outer pressures remain balanced because gas then escapes through vent 62 beyond $h_1 = 0$.

The gas and water mixture which sweeps the assembly is split up in the flaring part 36 protected by a water guard. The gas collects in the upper part of water box 32. Since vent 62 is at a higher level than tapping 31, no gas can pass into the water loop 12. In other words, the tapping 33 is always protected by a hydraulic guard.

In the water loop, detector 80 provides a measurement of the activity of successive samples isolated in the counting chamber 82. Detector 80 and associated chamber 82 will in general be calibrated in the laboratory for comparing the law of variation of activity in time for the fission products coming from the assembly and the law of variation for a solution. A subsequent off-line check may be carried out on samples taken by apparatus 78.

Similarly, detector 94 will be used for determining the evolution in time of the characteristic peaks of Xe 133 and Kr 85. Here again an a posteriori check may be made on samples taken by means of apparatus 92.

The activity measurements are made while the assembly is held at a constant temperature, controlled with heater 74 and possibly cooler 76 energized by a regulation system, whereas the hood is thermally isolated from the swimming pool by driving the water out of spaces 22 and 56.

Once an assembly has been tested, is is removed and replaced by another. Removal takes place in a conventional way, using a remote controlled gripper, after lid 58 has been opened by ram 64.

Between two sipping tests, it may be necessary to clean the circuits which conveyed gas which swept an assembly being tested. Cleaning must be carried out systematically when the residual activity level measured in the loops exceeds a predetermined acceptable threshold.

This cleaning may be provided:
by injecting purified compressed air in all the circuits of the gas loop and in the cell, then discharging this gas to the effluent exhaust,
by means of the pump of the gas loop 88; by degasifying the part of the gas circuit situated outside the water. This process is of particular advantage upon pollution by vapor condensation in the counting chamber of the detector, which avoids having to remove this latter out of the lead cask in which it is housed.

A second anti-water-rise device similar to device 85 is typically placed in the duct opening into the bottom of the cell so as to avoid flooding the circuits during degasification.

I claim:

1. A process for detecting defective fuel elements in a nuclear fuel assembly, comprising the steps of
   (a) locating a fuel assembly in a sipping hood;
   (b) causing said fuel assembly to heat for increasing gas pressure in the sheaths of the fuel assembly;
   (c) forming a mixture of water and inert gas dispersed in said water and continuously introducing said mixture at the lower portion of said hood for sweeping said fuel assembly in said hood with an upward circulation of said mixture;
   (d) separating said water and inert gas in the mixture leaving said hood at an upper portion of the hood above said fuel assembly and circulating the separated water and inert gas through separate respective measuring loops;
   (e) continuously monitoring the presence of water-soluble fission products in the water loop by measuring the activity of the separated water and monitoring the presence of fission products dispersed in said inert gas in said gas loop, and
   (f) recycling said inert gas and water to form said mixture.

2. A process according to claim 1, wherein a constant volume is maintained in the water loop.

3. A process according to claim 1, wherein said water and inert gas are mixed by introducing them separately into lower portion of said hood and circulating them together to a homogenization filter before they circulate upwardly in said hood and sweep said fuel assembly.

4. A process according to claim 3, wherein said inert gas and water are separated in a water box located above said hood and said gas is extracted at the top of said water box while said water is extracted at a level lower than that of a protection water layer in said water box.

5. A process according to claim 1, wherein said fuel assembly is maintained at a constant predetermined temperature during inspection thereof.

6. A process according to claim 1, wherein the activity of the fission product in said inert gas is measured with an energy selective detector associated with a multi-channel analyzer, for separately determining the contents of radioactive xenon and krypton in said inert gas.

7. A device for detecting defective fuel element sheaths in a nuclear fuel assembly, comprising:
   a double wall cell for immersion in upstanding position in a pool,
   a hood arranged for being received in said cell and for receiving a fuel assembly to be inspected,
   means for adjusting a water level between the two walls of said cell,
   circuit means for circulating water and an inert gas along a path including said hood, said circuit means having a water loop and an inert gas loop having a common part in said hood, said common part comprising a homogeneization filter located in the lower portion of said hood and means for injecting water and inert gas into said hood under the filter, and respective measurement means in said water loop and inert gas loop for measuring the contents of water soluble fission products in water and gas driven products in said inert gas.

8. A device according to claim 7, wherein the space between the two walls of said cell has a communication with pool water at the lower portion thereof and is provided at the upper portion thereof with means for injecting pressurized gas into said space for forcing out water and providing a thermal insulation of said hood.

9. A device according to claim 7, wherein said hood has a bulging upper portion located in a water box for inert gas-water separation, said water box being provided with an upper outlet for said inert gas and a lateral outlet for water extraction located at the level lower than an upper edge of said bulging portion.

10. A device according to claim 9 wherein said water box is provided with a vent located at a level higher than the upper edge of said bulging portion and the level of the water outlet.

* * * * *